(12) United States Patent
Meyer et al.

(10) Patent No.: US 6,695,414 B2
(45) Date of Patent: Feb. 24, 2004

(54) METHOD OF MANUFACTURING A BRUSH HEAD BY WAY OF AN INJECTION MOLDING PROCESS

(75) Inventors: Berthold Meyer, Neustadt/Wied (DE); Gerd Broecker, Ruescheid (DE)

(73) Assignee: M + C Schiffer GmbH, Neustadt/Weid (DE)

( * ) Notice: Subject to any disclaimer, the term of this patent is extended or adjusted under 35 U.S.C. 154(b) by 306 days.

(21) Appl. No.: 09/741,027

(22) Filed: Dec. 21, 2000

(65) Prior Publication Data

US 2001/0013152 A1 Aug. 16, 2001

(30) Foreign Application Priority Data

Dec. 22, 1999 (DE) ......................................... 199 62 188

(51) Int. Cl.$^7$ ................................................. A46D 3/00
(52) U.S. Cl. ......................... 300/21; 264/243; 264/255
(58) Field of Search ............................ 300/21; 264/243, 264/255

(56) References Cited

U.S. PATENT DOCUMENTS

| | | | | |
|---|---|---|---|---|
| 2,298,156 A | * | 10/1942 | Person | 300/21 X |
| 2,317,110 A | * | 4/1943 | Person | 264/243 |
| 2,592,296 A | * | 4/1952 | Kutik | 300/21 X |
| 5,045,267 A | * | 9/1991 | Weihrauch | 264/243 |
| 5,054,154 A | | 10/1991 | Schiffer et al. | 15/167.1 |
| 5,458,400 A | * | 10/1995 | Meyer | 300/21 |
| 5,761,759 A | * | 6/1998 | Leversby et al. | 264/243 X |
| 6,311,360 B1 | * | 11/2001 | Lanvers | 300/21 X |

FOREIGN PATENT DOCUMENTS

| | | | | |
|---|---|---|---|---|
| DE | 845 933 | 6/1953 | | |
| DE | 1 554 925 | 1/1973 | | |
| DE | 38 32 520 | 4/1990 | | |
| DE | 35 11 528 | 1/1991 | | |
| DE | 94 20 405.5 | 4/1995 | | |
| DE | 36 42 124 | 11/1995 | | |
| DE | 196 00 767 | 1/1996 | | |
| EP | 0 759 711 | 3/1997 | | |
| FR | 981311 | * | 3/1951 | 300/21 |
| FR | 1133844 | * | 11/1956 | 300/21 |
| WO | 97/24048 | 7/1997 | | |
| WO | 98/00047 | * | 1/1998 | |

* cited by examiner

*Primary Examiner*—Mark Spisich
(74) *Attorney, Agent, or Firm*—Lawrence E. Laubscher, Sr.

(57) ABSTRACT

The present invention relates to a method of manufacturing a brush head comprising a brush head body carrying bristle bundles, in particular for tooth brushes, by way of injection molding, in which a first plastic component is injected into a first mold cavity for forming a bristle carrier, and ends of bristle filaments projecting into the first mold cavity are encompassed by the first plastic component. In order to guarantee a complete filling of the mold and a favorable reproduction of the mold cavity geometry, but to avoid at the same time a penetration of plastic mass into ducts in which the bristle filaments are held, it is suggested by the present invention that the bristle carrier manufactured during the first step is relocated into another mold cavity, which is larger than the bristle carrier, and which is filled with a hard component. The present invention further relates to a brush head, in particular for a tooth brush, comprising at least one brush head body carrying a bristle bundle in which the fixing-sided ends of bristle filaments are embedded by an over-molding, wherein it is suggested according to the invention in order to provide a brush head complying with the above-mentioned demands, that the brush body comprises a bristle carrier encompassing the bristle filaments on the attachment side, the bristle carrier being embedded into a hard component.

7 Claims, 1 Drawing Sheet

METHOD OF MANUFACTURING A BRUSH HEAD BY WAY OF AN INJECTION MOLDING PROCESS

BACKGROUND OF THE INVENTION

1. Field of the Invention

The present invention refers to a method of manufacturing a brush head, in particular for tooth brushes, comprising at least one brush head carrier carrying bristle filaments, by way of an injection molding process, in which a first plastic component is injected into a first mold cavity for forming a bristle carrier, and in which ends of bristle filaments projecting into the first mold cavity are encompassed by the first plastic component. The present invention relates further to a brush head, in particular for a tooth brush, comprising a brush head body carrying brush filaments, in which the fixing-sided ends of bristle filaments are embedded by means of over-molding.

2. Description of the Prior Art

A method of the above-mentioned type is for instance known from DE 845 933 going back to the applicant. The generic method differs from the conventional method of manufacturing a brush head in which recesses are made in the brush head when the brush head is injection molded, wherein bristle filaments are inserted and held into the brush head later by means of anchors, in such a manner that the bristle filaments are joined with the brush head body directly during the injection molding process. In order to obtain as reliable a connection as possible between the brush head body and the bristle filaments usually combined to form bristle bundles, the bristle bundles are regularly melted to a unit at their fixing-sided ends before injecting the plastic component. In the generic process, the enlargement and/or the fixing-sided ends of the bristle filaments are fully or partially encompassed by the first plastic component.

The generic method is particularly suitable for the manufacture of brushes having a relatively thin brush head and this is also preferable for cost reasons. However, the sealing of the ducts of the injection molding tool in which the bristle bundles are held is problematic. In view of an optimal mold filling and a precise design of the mold cavity geometry, as high an injection molding pressure as possible is preferred. The ducts holding the bristle bundles, however, form outlets into which plastic mass is pressed where excessive injection pressure is applied. Thereby the bundle position of the bristle bundles is damaged. The brush is useless. When excessive injection pressure is applied the bundles are also pressed out of the ducts.

Suggestions as to how to solve this problem were not missing in the prior art. It is suggested by DE 38 52 520 that sleeves be inserted into the ducts that have slots at their mold cavity-sided ends and which abut at a conical surface of the injection molding tool and which are pressed radially inward in such a manner to seal the bristle bundle held in the sleeve. It is also known from DE 15 54 925 to hold the bristle bundles in a clamping plate to seal the mold cavity with respect to the bristle bundles in case of injection molding pressure. The proposed solution does, however, require an expensive construction. The solution mentioned last moreover can only be realized in ducts that are arranged in an offset manner to one another. Thereby the geometry of the bristle field is predefined and restricted in an undesired manner.

Moreover, it is known from the prior art to attach the enlargement formed by melting at lie the fixing-sided ends of the bristle bundle directly to the mouth of the ducts holding the bristle bundles (DE 35 11 528). The bundles are held in the brush head body during such a process only with an insufficient expansion force. This should be avoided by an extension of the ducts into the mold cavity as suggested by DE 36 42 124. However, ducts projecting from the bristle surface into the brush body encompassing the individual bristle bundles are produced in which bacteria and dirt can get caught, which is not tolerable in particular in body care brushes, especially tooth brushes.

Besides constructive measures of sealing a mold cavity, it is furthermore known from the prior art to adapt the procedure and to let a relatively low injection pressure act when injecting the plastic mass, said injection pressure being increased after stabilizing the surface of the brush head body penetrated by the bristle bundles in order to counteract a thermal loss and to achieve as complete a design of the mold geometry as possible. Constructive measures at the mold cavity geometry were suggested which should enhance a possibly early stabilization of the surface of the brush head body penetrated by the bristle bundles.

It was for instance suggested in EP 0 749 711 that a collar be formed at the injection molding tool, said collar projecting inwardly into the mold cavity, said collar encompassing each individual bristle bundle. This proposal involves hygiene problems, since this collar is formed at the ready brush as an annular gap encompassing the bristle bundles in which dust and impurities can get caught. According to a further proposal of EP 0 759 711, the shaping tool shall have an annular gap encompassing each bristle bundle to enhance the quick stabilization of shaping mass encompassing the respective bristle bundle. This measure also leads to a contoured, i.e. unplanar, bristle surface. The bristle surface is the surface of the brush head body penetrated by the bristle bundles.

The suggestions discussed above by means of which an emerging of plastic mass from the ducts when over-molding the fixing-sided bristle bundle is prevented, were not capable of fully eliminating the underlying problem. Where injection molding pressure is low at least at the beginning of the filling of the mold, the mold cavity geometry is not formed with the necessary precision If the injection molding pressure is increased, additional sealing measures are required to prevent a penetration of plastic mass into the ducts which hold the bristle bundles. Moreover, the generic method is regularly performed by easily flowing polypropylene having a high melding index (MFI) and which can be easily processed at relatively low injection molding pressures of e.g. 10 to 15 bar at a quite favorable mold filling.

Many brushes, in particular tooth brushes as well as the brush head bodies of these tooth brushes shall, however, be manufactured of plastics having difficult flow properties, which can only be introduced into the mold cavity at relatively high injection pressures of several hundred bar. The use of such high-quality plastics is, up to the present day, restricted to such brush heads at which the brush body is first of all formed by means of injection molding and is subsequently provided with bristle bundles which are fixed in the brush head body by means of metal anchors.

SUMMARY OF THE INVENTION

The present invention is s n the object of solving the above-mentioned problems and of developing a method of manufacturing a brush head of the above-mentioned kind in a manner that a brush head body or a complete tooth brush body containing the brush head body can be manufactured with a perfect surface and a precise design of the mold cavity geometry without the risk of plastic mass penetrating into the ducts holding the bristle bundles and the risk of damaging the bristle filaments projecting over the brush head body. The present invention is furthermore based on the object of providing a brush head of a tooth brush body containing the brush head body complying with these demands.

To achieve the above-mentioned object, the generic method is developed by the invention on file in that the bristle carrier is located into another mold cavity to form the brush head body, said mold cavity being larger than the bristle carrier and which is filled by a hard component. In the method according to the invention, the brush head body is manufactured by means of a two-component or two-color or multi-component injection molding process. During the first step of the two-component injection molding process, an easily flowing plastic material, which preferably has a low pastificabon temperature, is filled into the first mold cavity. This first plastic component in particular can be an easily flowing plastic material that can be processed at low temperatures and that has a high melting index (MFI). The first plastic component is only selected in view of the fact that a sufficient mold filling at the lowest possible temperatures and the lowest pressures possible. A complete filling of the mold cavity is not required, since preferably at most the surface of the core of the brush head body formed of the first component is visible at the surface thereof A plastic component having a relatively low plastification temperature is in particular chosen in view of the thermal affect of the bristle filaments projecting into the first mold cavity. Since the re-erection ability of these bristle filaments is ensured by hidden stabilized molecule chains, a heating of the stabilized molecules and therefore an at least partial reorientation of the molecules should be fully prevented, if possible.

There are no restrictions regarding the selection of the material and the injection molding parameters for processing the second components. The bristle filaments are held in the bristle carrier formed by the first plastic component. This bristle carrier seals the duds of the second mold cavity holding the bristle filaments. High injection pressures can therefore not reach the mouth of the ducts and cannot lead to a high pressing-out of the second plastic component into the ducts. High-quality or transparent plastics with difficult flow properties, such as ABS (acrylonitrile-butadiene-styrene copolymer), CAP (cellulose acetoproproplonate), CA (acetyl cellulose), PET (polyethylene terephtalate), POM (polyaformaldeyde) and PA (polyamide) can be used for forming the brush head body without having to forsake the advantages of an anchor-less attachment of the bundle in the brush head.

Due to the sealing of the ducts by the bristle carrier and the embedding of the bristle bodies into same, the injection of the second or a further plastic component into the second mold cavity is not subject to restrictions regarding the injection pressure, the selection of the materials or the injection temperature of the plastics. By filling the further mold cavity by the hard component, the bristle carrier formed first is over-molded. During this over-molding process, the bristle carrier may almost be completely embedded into the hard component. Then, almost the entire surface of the brush head body or a brush containing the brush head body is almost exclusively formed by the hard component. The bristle carrier can be joined with the hard component in the further mold cavity only on one side possibly by interposition of one or a plurality of further components, preferably a soft-elastic component. There, the brush head is predominantly or exclusively formed by the bristle carrier, whereas only the brush body is formed by injecting the hard component into the second mold cavity, and by the respective method for precisely forming the mold cavity geometry as a high-precision component.

The bristle carrier formed in the first mold cavity is, according to the invention, connected to a hard component by means of over-molding, to precisely fill certain parts or almost the entire surface of the brush by the hard component. Further plastic components, in particular soft-elastic components can be formed between the bristle carrier and the hard component by interconnected injection molding steps. After filling the further mold cavity by the hard component, further injection molding steps for filling in particular soft elastic functional elements or surfaces can follow. The further preferred embodiments of the method are left to the expert's discretion and it is essential for the method according to the invention that the hard component in the further mold cavity can be filled in without restricting the method parameters, and for instance the formation of a precise component directly or indirectly connected with the bristle carrier is possible.

In case of a conceivable procedure, a soft-elastic component, in particular a thermoplastic elastomer is first of all injected to the bristle carrier. Hereby soft-elastic clearing elements, extending as elongated naps parallel to the bristle bundles, may be provided at the bristle carrier The component manufactured in this manner is thereupon rearranged to a further mold cavity and finally over-molded by the hard component. In this procedure, the bristle carrier can be inserted into the further mold cavity in particular in a manner that the solidified bristle carrier fully covers at its end the further mold cavity.

With this embodimnet a component is obtained which does not have surfaces formed by the hard component at the surface penetrated by the bristles. On the other hand, such surfaces are preferably to be provided on the side of the bristle carrier opposite the bristle side that serve as functional surfaces for a connection of the bristle carrier at a handle. The functional surfaces may be formed as catch surfaces to lock the bristle carrier to the handle. If the handle contains the motor of an electric tooth brush, functional surfaces may moreover be provided by the hard component through which the bristle carrier is hingeable, pivotal or rotatably supported. Moreover, the functional surfaces may form connection elements through which the bristle carrier can be connected to and released from the motor. Finally, such functional surfaces may be provided that effect a sealing of the bristle carrier with respect to the handle.

A brush head comprising a plurality of brush head bodies may be manufactured by the method according to the invention, which are for instance coupled via a web encompassed by a soft-elastic material. In such a case, the brush head body bodies is inserted after manufacture of the brush head body into a following mold cavity by means of two-component or injection molding, said mold cavity being larger than the further mold cavity and which is filled by a soft-elastic component. In this manner, one or a plurality of elastic zones can be formed in the brush head and/or at the transition between the brush head and the handle, in which said zones the hard component is at most provided as a thin web and which comprise almost exclusively a soft-elastic component, in particular a thermoplastic elastomer which covers the free spaces between opposing brush head segments and which prevents penetration of dust and/or bacteria.

The above-mentioned over-moldings of a brush head body by soft-elastic mass are for instance known from DE 39 23 495 as an example for a brush head, which is elastically held at the handle, or they are known from WO 97/24048 as an example for elastic head segments. Contrary to this known prior art, the brush head body holding the bristle filaments is manufactured by the method according to the invention by means of two-component injection molding. The brush head body manufactured by means of a two-component injection molding process may of course comprise one or a plurality of elastic zones in which thermoplastic elastomer introduced by means of overmolding a third component is contained, or which is attached at the handle by interposition of an elastic zone containing a thermoplastic elastomer or the like.

In the method according to the invention, a hard component is preferably also used as a first plastic component. This hard component may be for instance polypropylene. The advantages of the method according to the invention can be realized especially favorably when the first mold cavity is filled by a plastic mass which has a relatively high melting index (MFI) whereas the further mold cavity is filled by a hard component that has a relatively low melting index.

In the same manner it is preferred to first of all inject a plastic component having a low plastification temperature into the first mold cavity and to fill the further mold cavity by a hard component having a higher plastification temperature.

Regarding the brush head of the above-mentioned kind, the object underlying the invention is solved in that the brush head body comprises a bristle body encompassing the bristle filaments at the attachment side, said bristle carrier being connected to a hard component Through the hard component, any component, in particular a high-precision component can be formed at the bristle carrier possibly by interposition of a soft-elastic layer or directly, or a segment of the brush body may be formed as a precision component.

If the bristle carrier forms at least a part of the surface of the brush head body penetrated by the bristle filaments, a penetration of dirt, bacteria etc. between the bristle carriers and the hard components embedding the bristle carrier preferably formed as a shell can be prevented in that the bristle carrier is positively connected to the hard component. It is especially preferred to encompass peripherally the bristle carrier by the hard component. Peripheral means that the hard component is provided at the side faces of the brush head extending substantially parallel to the bristle filaments. Additionally, the hard component is preferably also provided at the lower side of the brush head, formed opposite the bristle surface penetrated by the bristle filaments. Since the hard component can be injected at an increased pressure into the second mold cavity, details at the outer surface of the brush head body can be formed at high precision by means of injection molding by the hard component peripherally encompassing the bristle carrier.

Functional surfaces of that type are in particular locking noses etc. by means of which the brush head body is held in a recess formed in the brush head. A respective tooth brush is form instance known from DE-C 196 00 767. The functional surfaces can also be formed at the brush head to connect same to the handle (cf. DE-U-94 20 405).

BRIEF DESCRIPTION OF THE DRAWING

Further features, details and advantages of the invention can be derived from the following description of two embodiments.

FIG. 3 is an illustration according to FIG. 2 for an alternative embodiment of a brush head and.

DETAILED DESCRIPTION

Figure 2:
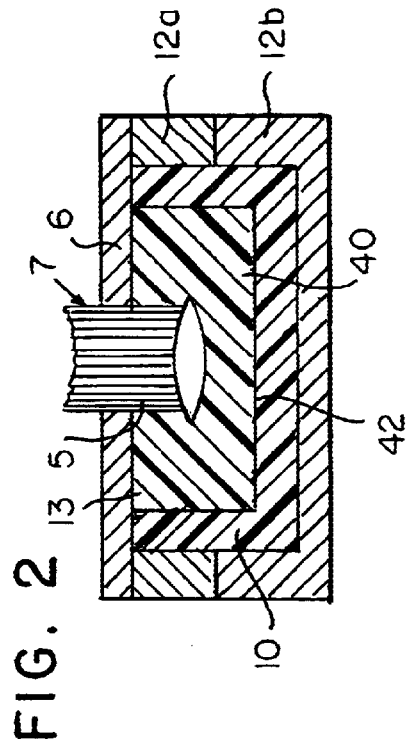
FIG. 2 is an illustration to elucidate the second injection molding step.
Figure 4:
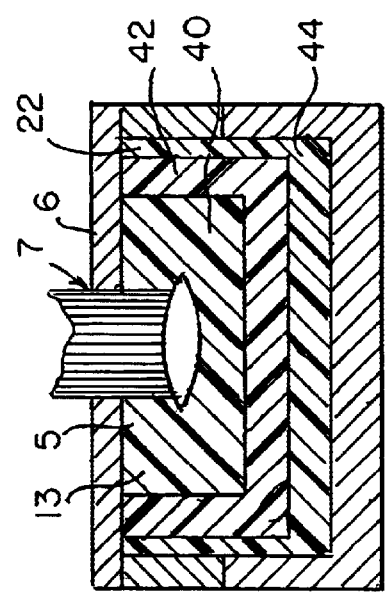
FIG. 4 is a sectional view illustrating a further manufacturing step from the step of FIG. 2.
Figure 1:
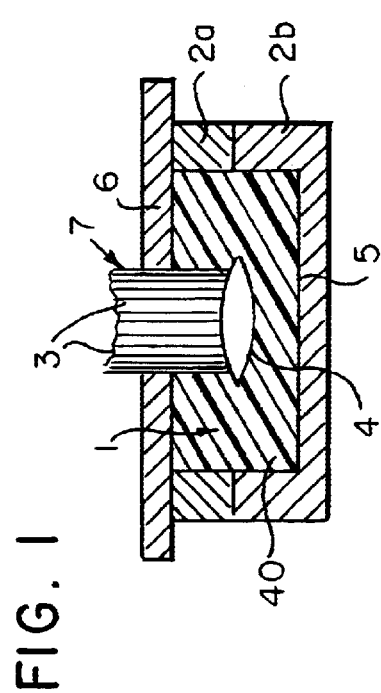
FIG. 1 is a schematic sectional view to elucidate the first injection molding step to manufacture the brush head body.

Two successive steps of the two-component injection molding process of the brush head body are shown in FIGS. 1 and 2. According to the illustration in FIG. 1, a mold cavity 1 encompassed by two injection molding halves 2a and 2b is filled by a first synthetic plastic component 40. Ends of bristle filaments 3 joined by an enforcement 4 formed by means of melting projecting into the mold cavity are flown around by the first component filled into the mold cavity 1. The enforcement 4 and parts of the ends of the bristle filaments 3 are accommodated in the bristle carrier manufactured in this manner.

After solidification of the first plastic component forming the bristle carrier 5, the bristle carrier is rearranged together with a perforated plate 6 covering the injection molding half 2a into a second mold cavity 10 (cf. FIG. 2). The bristle carrier 5 is arranged in this second mold cavity 10 in a manner that the bristle surface of the bristle carrier 5 penetrated by the bristle filaments 3 is held flush in the second injection mold 10. The bristle carrier therefore contacts planarly the inner surface of the perforated plate 6 with its smooth surface and seals ducts 7 for accommodating the bristle filaments 3 in the perforated plate 6.

The hard component 42 injected into the second mold cavity 10 embeds the bristle carrier during this second injection molding step of the two-component injection molding technique for manufacturing a brush head body 13, it is prevented by the bristle carrier 5 contacting flush the perforated plate 6 that injection molding mass penetrates into the duct 7. The bristle filaments 3 are also thermally insulated against the second component by the bristle carrier 5. Even when injecting a hard component 42 into the second mold cavity 10 at a relatively high pressure it must not be feared that this hard component penetrates into the ducts 7. A thermal affect of the bristle filaments 3 by a hard component injected into the second mold cavity 10 at a relatively high temperature must not be feared either.

The brush head body 13 shown in the cross sectional view in FIG. 2 has a bristle surface penetrated by the bristle filaments 3, said bristle surface being partially formed by the first component 40 and partially by the second component 42.

Figure 3:
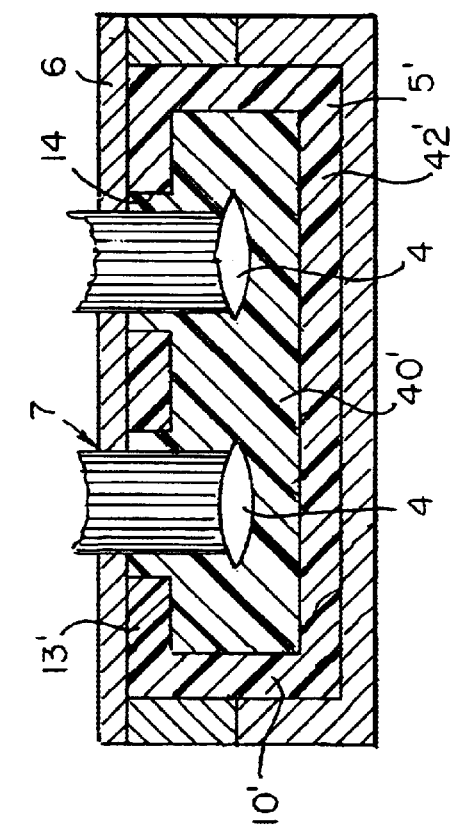

In contrast thereto, a bristle carrier is first of all formed in the embodiment shown in FIG. 3 in a first mold cavity, which is not shown, by means of injection molding, said bristle carrier having a surface, which comprises a collar 14 which annularly encompass bristle filaments 3 combined to form bristle bundles. In the second injection mold 10', the front end face of these collars contacts the inner surface of the perforated plate 6 and seals the ducts 7 with respect to the second mold cavity 10'. This mold cavity is filled in the above-mentioned manner by the hard component 42' during a second injection molding step. The brush head body 13 manufactured in this manner also comprises almost exclusively the hard component at its bristle surface. Only the surface section of the bristle surface directly encompassing the bristle bundles is formed by the first component 40'. The collar 14 can be formed relatively thin and can in particular be conical. it is only required for the dimensioning of the collar 14 that the ducts 7 are sealed against the second component 42' injected into the second mold cavity 10'. The design of the geometric cross sectional shape of the collar 14 and the base surface of the collar 14 shown in top view belongs to the expert's discretion. The collar may have a round or polygonal base surface. As already mentioned, the collar 14 may be cylindrical or it may be formed in a manner projecting the bristle carrier 5 in a truncated-conical shape.

Concerning the brush head body shown in FIG. 2 in cross section, the bristle carrier 5 is embedded into the hard component in a U-shape. Concerning the brush head body schematically shown in FIG. 3, the bristle surface of the bristle carrier is almost completely covered by the hard component so that the bristle carrier is almost completely covered by the hard component.

Following the second molding step shown in FIG. 2, the brush head carrier formed in the second mold cavity 10 is relocated to a larger mold cavity 22 which is then filled with a soft resilient component 44, similar to the thermoplastic elastomer of the published application WO 97/24048 discussed above.

What is claimed is:

1. A method for manufacturing a brush head including an injection molded brush head carrier supporting a plurality of bristle filament bundles, comprising:

(a) inserting first end portion (4) of the bristle filament bundles (3) in a first mold cavity (1), the other ends of the bristle filament bundles projecting outwardly from said first mold cavity via a perforated plate (6) that defines one wall of said first mold cavity;

(b) injecting a relatively soft first synthetic plastic component (40) in the heated fluid state within said first mold cavity, thereby to encompass the first ends of said bristle filament bundles and, upon hardening, to define said brush head carrier (5);

(c) transferring the brush head carrier to a position within a second mold having a larger second mold cavity (10) with the bristle filament bundles extending outwardly from said second mold via said perforated plate; and (d) injecting a relatively hard second synthetic plastic component (42) in the fluid state within said second mold cavity to at least partially cover and over-mold said brush head carrier, at least that portion of said brush head carrier surrounding said bristle bundle first ends being maintained in flush sealed engagement with said perforated plate, thereby to isolate the duct openings (7) of the perforated plate from said second component.

2. A method for manufacturing a brush head as defined in claim 1, and further including:

(e) transferring the over-molded brush head into a still larger third mold cavity (22) of a third mold; and (f) filing the space in said third mold cavity with a relatively soft resilient third synthetic plastic component (44).

3. A method for manufacturing a brush head as defined in claim 1, wherein said second mold cavity is fully covered by the brush head carrier at the side adjacent the bristle filaments.

4. A method for manufacturing a brush head as defined in claim 1, wherein said first component has a higher melting index (MFI) than said second component.

5. A method for manufacturing a brush head as defined in claim 1, wherein said first component has a lower plastification temperature than said second component.

6. A method for manufacturing a brush head as defined in claim 1, wherein said second component is injected into said second mold cavity at a pressure greater than $10^7$ Pa.

7. A method for manufacturing a brush head as defined in claim 1, wherein said second component defines a handle portion of the resulting brush.

* * * * *